(12) United States Patent
Borthakur et al.

(10) Patent No.: US 7,437,375 B2
(45) Date of Patent: Oct. 14, 2008

(54) SYSTEM AND METHOD FOR COMMUNICATING FILE SYSTEM EVENTS USING A PUBLISH-SUBSCRIBE MODEL

(75) Inventors: Dhrubajyoti Borthakur, San Jose, CA (US); Nur Premo, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 613 days.

(21) Appl. No.: 10/919,855

(22) Filed: Aug. 17, 2004

(65) Prior Publication Data

US 2006/0041593 A1 Feb. 23, 2006

(51) Int. Cl.
G06F 17/30 (2006.01)
G06F 7/00 (2006.01)

(52) U.S. Cl. .................................. 707/101; 707/104.1

(58) Field of Classification Search .................. 707/101, 707/104.1
See application file for complete search history.

(56) References Cited

U.S. PATENT DOCUMENTS

| | | | |
|---|---|---|---|
| 5,890,147 A | 3/1999 | Peltonen et al. | |
| 5,907,837 A | 5/1999 | Ferrell et al. | |
| 6,026,474 A | 2/2000 | Carter et al. | |
| 6,065,100 A * | 5/2000 | Schafer et al. | 711/137 |
| 6,240,401 B1 | 5/2001 | Oren et al. | |
| 6,240,429 B1 | 5/2001 | Thornton et al. | |
| 6,286,013 B1 | 9/2001 | Reynolds et al. | |
| 6,374,260 B1 | 4/2002 | Hoffert et al. | |
| 6,389,538 B1 | 5/2002 | Gruse et al. | |
| 6,401,097 B1 | 6/2002 | McCotter et al. | |
| 6,522,268 B2 | 2/2003 | Belu | |
| 6,804,687 B2 * | 10/2004 | Sampson | 707/200 |
| 6,898,618 B1 * | 5/2005 | Slaughter et al. | 709/203 |
| 6,938,083 B1 | 8/2005 | Teague | |
| 6,970,866 B1 | 11/2005 | Pravetz et al. | |
| 7,013,331 B2 | 3/2006 | Das | |
| 7,020,658 B1 | 3/2006 | Hill | |
| 7,043,488 B1 | 5/2006 | Baer et al. | |
| 7,058,624 B2 | 6/2006 | Masters | |
| 7,058,696 B1 * | 6/2006 | Phillips et al. | 709/217 |
| 7,107,497 B2 * | 9/2006 | McGuire et al. | 714/48 |
| 7,110,983 B2 | 9/2006 | Shear et al. | |
| 7,188,118 B2 | 3/2007 | Borthakur et al. | |

(Continued)

OTHER PUBLICATIONS

H.T. Kung, et al.: Content Network: Taxonomy and New Approaches, Harvard University, 2002.*

(Continued)

*Primary Examiner*—Kuen S Lu
(74) *Attorney, Agent, or Firm*—Meyertons Hood Kivlin Kowert & Goetzel, P.C.; Anthony M. Petro

(57) ABSTRACT

A system and method for communicating file system events using a publish-subscribe model. In one embodiment, the system may include a storage device configured to store data and a file system configured to manage access to the storage device and to store file system content. The file system may be further configured to detect a file system content access event, and in response to detecting the file system content access event, to publish a record of the file system content access event to a publish-subscribe channel accessible by one or more applications.

20 Claims, 8 Drawing Sheets

U.S. PATENT DOCUMENTS

| | | | |
|---|---|---|---|
| 2001/0025311 | A1 | 9/2001 | Arai et al. |
| 2002/0049731 | A1 | 4/2002 | Kotani |
| 2003/0093556 | A1 | 5/2003 | Yeung et al. |
| 2003/0151633 | A1 | 8/2003 | George et al. |
| 2003/0154271 | A1 | 8/2003 | Baldwin et al. |
| 2003/0172368 | A1 | 9/2003 | Alumbaugh et al. |
| 2003/0217139 | A1* | 11/2003 | Burbeck et al. ............. 709/224 |
| 2004/0002942 | A1 | 1/2004 | Pudipeddi et al. |
| 2004/0059866 | A1 | 3/2004 | Patel et al. |
| 2004/0133544 | A1 | 7/2004 | Kiessig et al. |
| 2004/0225730 | A1 | 11/2004 | Brown et al. |
| 2004/0243554 | A1 | 12/2004 | Broder et al. |
| 2005/0015461 | A1 | 1/2005 | Richard et al. |
| 2005/0038813 | A1 | 2/2005 | Apparao et al. |
| 2005/0050107 | A1 | 3/2005 | Mane et al. |
| 2005/0114363 | A1 | 5/2005 | Borthakur et al. |
| 2005/0114381 | A1 | 5/2005 | Borthakur et al. |
| 2005/0114406 | A1 | 5/2005 | Borthakur et al. |
| 2005/0198010 | A1 | 9/2005 | Borthakur et al. |
| 2006/0004759 | A1 | 1/2006 | Borthakur et al. |
| 2006/0004787 | A1 | 1/2006 | Borthakur et al. |
| 2006/0059204 | A1 | 3/2006 | Borthakur et al. |
| 2006/0074912 | A1 | 4/2006 | Borthakur et al. |

OTHER PUBLICATIONS

"The Business Rationale for Distributed (Remote) Document Capture," Verity White Paper, Oct. 2003, downloaded from http://www.cardiff.com/cms/groups/public/documents/collateral/mk0535.pdf, 12 pages.

"Native XML Management With Documentum," Documentum Technical White Paper, Jul. 2003, downloaded from http://software.emc.com/collateral/content_management/documentum_family/wp_tech_xml.pdf, 15 pages.

Autonomy XML White Paper, Oct. 2003, downloaded from http://www.autonomy.com/content/downloads/White%20Papers/index.en.html, 11 pages.

Autonomy Technology White Paper, Nov. 2003, downloaded from http://www.autonomy.com/content/downloads/White%20Papers/index.en.html, 19 pages.

"DCMI Abstract Data Model," Dublin Core Metadata Initiative, Feb. 2004, downloaded from http://www.ukoln.ac.uk/metadata/dcmi/abstract-model/2004-02-04/, 17 pages.

Staples et al., "The Fedora Project: An Open-source Digital Object Repository Management System," in D-Lib Magazine, v. 9, No. 4, Apr. 2003, downloaded from http://web.archive.org/web/20040203065018/www.dlib.org/dlib/april03/staples/04staples.html, 12 pages.

Wildermuth, "A Developer's Perspective on WinFS: Part 1," Mar. 2004, downloaded from http://web.archive.org/web/20050414063209/http://msdn.microsoft.com/data/winfs/default.aspx?pull=/library/en-us/dnwinfsta/html/winfsdevpersp.asp, 10 pages.

Pilgrim, Mark "What Is RSS", XML.com http://www.xml.com/pub/a/2002/12/18/dive-into-eml.html, Dec. 18, 2002, pp. 1-8.

Alonso, Gustavo "Message Oriented Middleware" Chapter 3, Computer Science Department, Swiss Federal Institute of Technology, http://www.ids.inf.ethz.ch/, pp. 1-22.

Nunn, Robert "Distributed Software Architectures Using Middleware", 3C05 Coursework 2, http://www./cs.ucl.ac.uk/staff/W.Emmerich/lectures/3C05-02-03/aswe18-essay.pdf, pp. 1-5.

* cited by examiner

SYSTEM AND METHOD FOR COMMUNICATING FILE SYSTEM EVENTS USING A PUBLISH-SUBSCRIBE MODEL

BACKGROUND

1. Field of the Invention

This invention relates to computer systems and, more particularly, to file-based storage systems.

2. Description of the Related Art

Computer systems often process large quantities of information, including application data and executable code configured to process such data. In numerous embodiments, computer systems provide various types of mass storage devices configured to store data, such as magnetic and optical disk drives, tape drives, etc. To provide a regular and systematic interface through which to access their stored data, such storage devices are frequently organized into hierarchies of files by software such as an operating system. Often a file defines a minimum level of data granularity that a user can manipulate within a storage device, although various applications and operating system processes may operate on data within a file at a lower level of granularity than the entire file.

During the course of system operation, files may be created, manipulated and deleted, and the data stored in files may be read and/or modified. In conventional storage systems, applications may receive information about various events that transpire with respect to files or their content through a request-response interface. In typical request-response interfaces, a requesting application may convey a request to an information source, such as through a function call that may pass through a network (if the requesting application executes on a system that is remote to the information source). The requesting application may then wait for a response including the requested information, during which time the application may not perform any other tasks (i.e., the request may be a blocking call).

The request-response model has several disadvantages, however. Blocking requests may cause the application to stall for lengthy periods if the information source is busy or if the communication path to the source is slow or congested, decreasing application performance. In the worst case, deadlock or undesirable side effects may occur if a request or response is lost in transit or if either the requestor or the responding source becomes unavailable during the transaction. Additionally, the request-response model generally requires that each requesting application make a request even if the desired information is not available, and may require that the requesting application cull through irrelevant information to find information of interest, both of which increase processing overhead.

SUMMARY

Various embodiments of a system and method for communicating file system events using a publish-subscribe model are disclosed. In one embodiment, the system may include a storage device configured to store data and a file system configured to manage access to the storage device and to store file system content. The file system may be further configured to detect a file system content access event, and in response to detecting the file system content access event, to publish a record of the file system content access event to a publish-subscribe channel accessible by one or more applications.

In one specific implementation, the system further includes a query system configured to evaluate queries formulated in a query language, where a given query is associated with the publish-subscribe channel, and where the record is published to the publish-subscribe channel in response to determining that the file system content access event satisfies the given query.

A method is further contemplated that, in one embodiment, includes detecting a file system content access event, and in response to detecting the file system content access event, publishing a record of the file system content access event to a publish-subscribe channel accessible by one or more applications.

Figure 1:
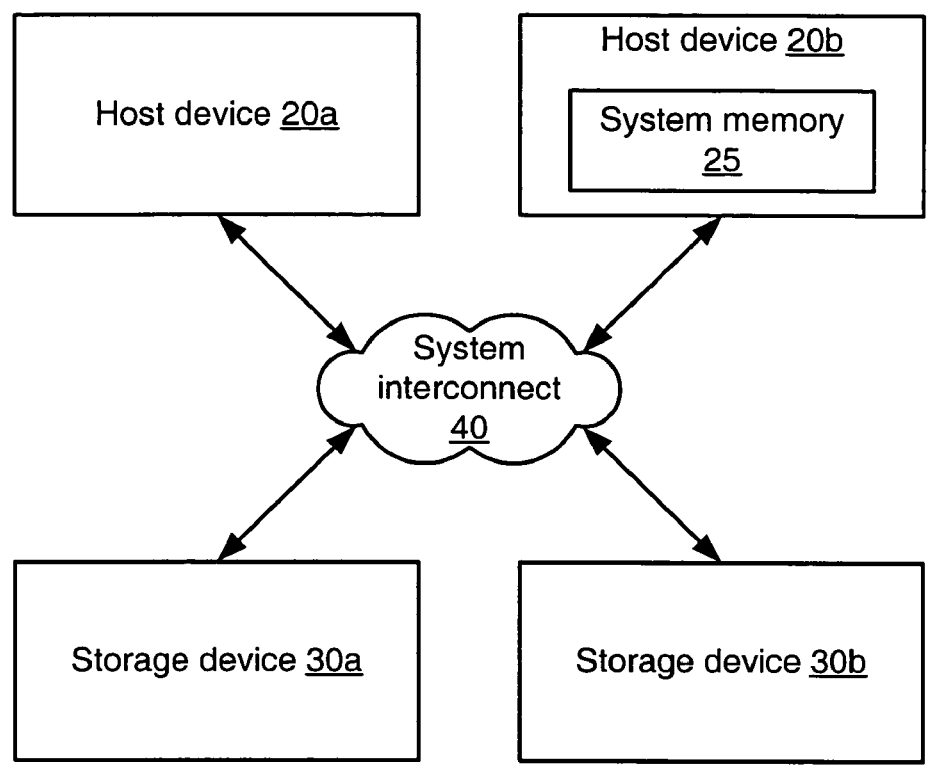
FIG. 1 is a block diagram illustrating one embodiment of a storage system.
Figure 1:

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System Overview

Turning now to FIG. 1, a block diagram of one embodiment of a computer system is shown. In the illustrated embodiment, system 10 includes a plurality of host devices 20a and 20b coupled to a plurality of storage devices 30a and 30b via a system interconnect 40. Further, host device 20b includes a system memory 25 in the illustrated embodiment. For simplicity of reference, elements referred to herein by a reference number followed by a letter may be referred to collectively by the reference number alone. For example, host devices 20a and 20b and storage devices 30a and 30b may be referred to collectively as host devices 20 and storage devices 30.

In various embodiments of system 10, host devices 20 may be configured to access data stored on one or more of storage devices 30. In one embodiment, system 10 may be implemented within a single computer system, for example as an integrated storage server. In such an embodiment, for example, host devices 20 may be individual processors, system memory 25 may be a cache memory such as a static RAM (SRAM), storage devices 30 may be mass storage devices such as hard disk drives or other writable or rewritable media, and system interconnect 40 may include a peripheral bus interconnect such as a Peripheral Component Interface (PCI) bus. In some such embodiments, system interconnect 40 may include several types of interconnect between host devices 20 and storage devices 30. For example, system interconnect 40 may include one or more processor buses (not shown) configured for coupling to host devices 20, one or more bus bridges (not shown) configured to couple the processor buses to one or more peripheral buses, and one or more storage device interfaces (not shown) configured to couple the peripheral buses to storage devices 30. Storage device interface types may in various embodiments include the Small Computer System Interface (SCSI), AT Attachment Packet Interface (ATAPI), Firewire, and/or Universal Serial Bus (USB), for example, although numerous alternative embodiments including other interface types are possible and contemplated.

In an embodiment of system 10 implemented within a single computer system, system 10 may be configured to provide most of the data storage requirements for one or more other computer systems (not shown), and may be configured to communicate with such other computer systems. In an alternative embodiment, system 10 may be configured as a distributed storage system, such as a storage area network (SAN), for example. In such an embodiment, for example, host devices 20 may be individual computer systems such as server systems, system memory 25 may be comprised of one or more types of dynamic RAM (DRAM), storage devices 30 may be standalone storage nodes each including one or more hard disk drives or other types of storage, and system interconnect 40 may be a communication network such as Ethernet or Fibre Channel. A distributed storage configuration of system 10 may facilitate scaling of storage system capacity as well as data bandwidth between host and storage devices.

In still another embodiment, system 10 may be configured as a hybrid storage system, where some storage devices 30 are integrated within the same computer system as some host devices 20, while other storage devices 30 are configured as standalone devices coupled across a network to other host devices 20. In such a hybrid storage system, system interconnect 40 may encompass a variety of interconnect mechanisms, such as the peripheral bus and network interconnect described above.

It is noted that although two host devices 20 and two storage devices 30 are illustrated in FIG. 1, it is contemplated that system 10 may have an arbitrary number of each of these types of devices in alternative embodiments. Also, in some embodiments of system 10, more than one instance of system memory 25 may be employed, for example in other host devices 20 or storage devices 30. Further, in some embodiments, a given system memory 25 may reside externally to host devices 20 and storage devices 30 and may be coupled directly to a given host device 20 or storage device 30 or indirectly through system interconnect 40.

In many embodiments of system 10, one or more host devices 20 may be configured to execute program instructions and to reference data, thereby performing a computational function. In some embodiments, system memory 25 may be one embodiment of a computer-accessible medium configured to store such program instructions and data. However, in other embodiments, program instructions and/or data may be received, sent or stored upon different types of computer-accessible media. Generally speaking, a computer-accessible medium may include storage media or memory media such as magnetic or optical media, e.g., disk or CD-ROM included in system 10 as storage devices 30. A computer-accessible medium may also include volatile or non-volatile media such as RAM (e.g. SDRAM, DDR SDRAM, RDRAM, SRAM, etc.), ROM, etc, that may be included in some embodiments of system 10 as system memory 25. Further, a computer-accessible medium may include transmission media or signals such as electrical, electromagnetic, or digital signals, conveyed via a communication medium such as network and/or a wireless link, which may be included in some embodiments of system 10 as system interconnect 40.

In some embodiments, program instructions and data stored within a computer-accessible medium as described above may implement an operating system that may in turn provide an environment for execution of various application programs. For example, a given host device 20 may be configured to execute a version of the Microsoft Windows operating system, the Unix/Linux operating system, the Apple Macintosh operating system, or another suitable operating system. Additionally, a given host device may be configured to execute application programs such as word processors, web browsers and/or servers, email clients and/or servers, and multimedia applications, among many other possible applications.

Figure 2:
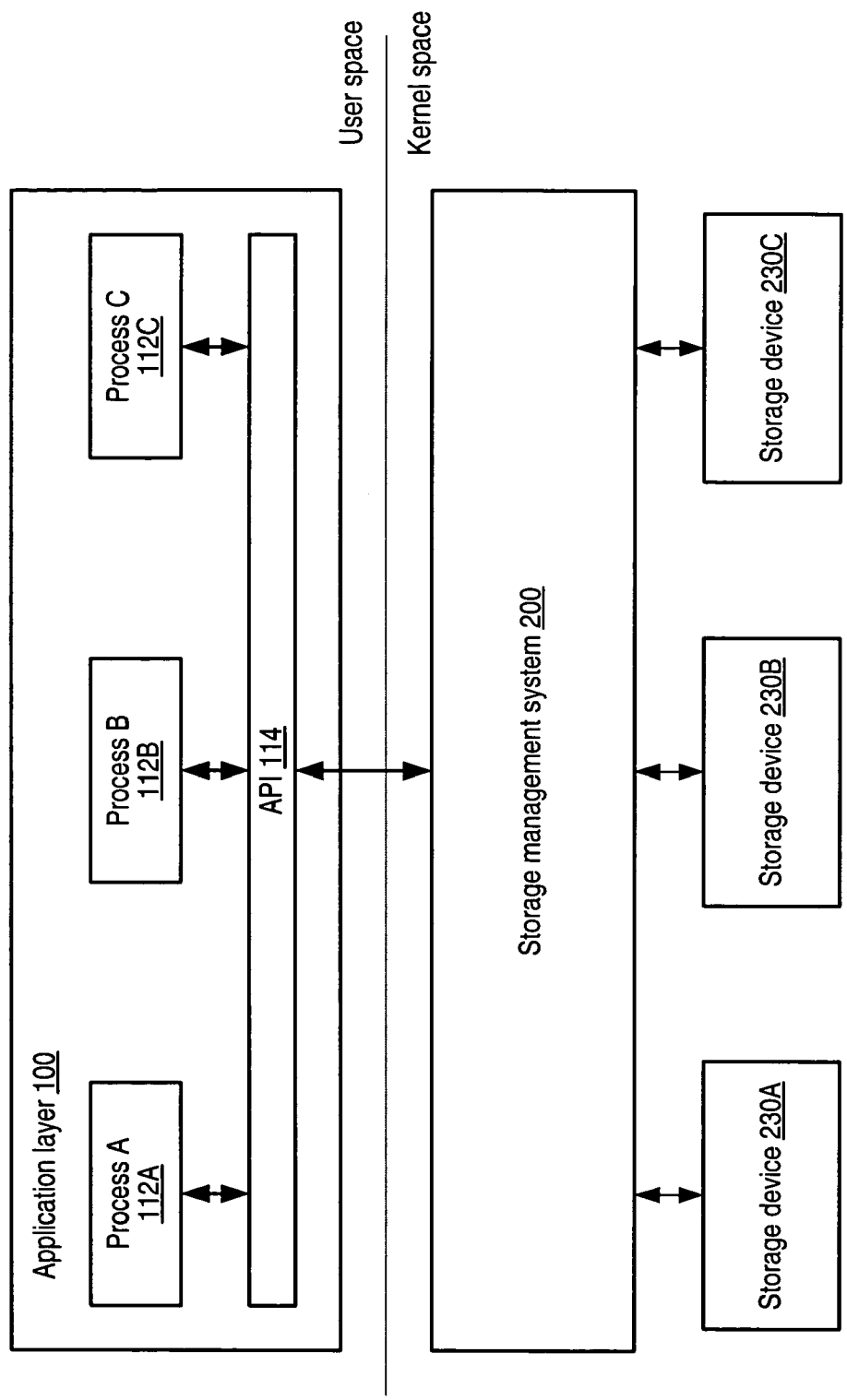
FIG. 2 is a block diagram illustrating one embodiment of a software-based storage system architecture and its interface to storage devices.
Figure 8:
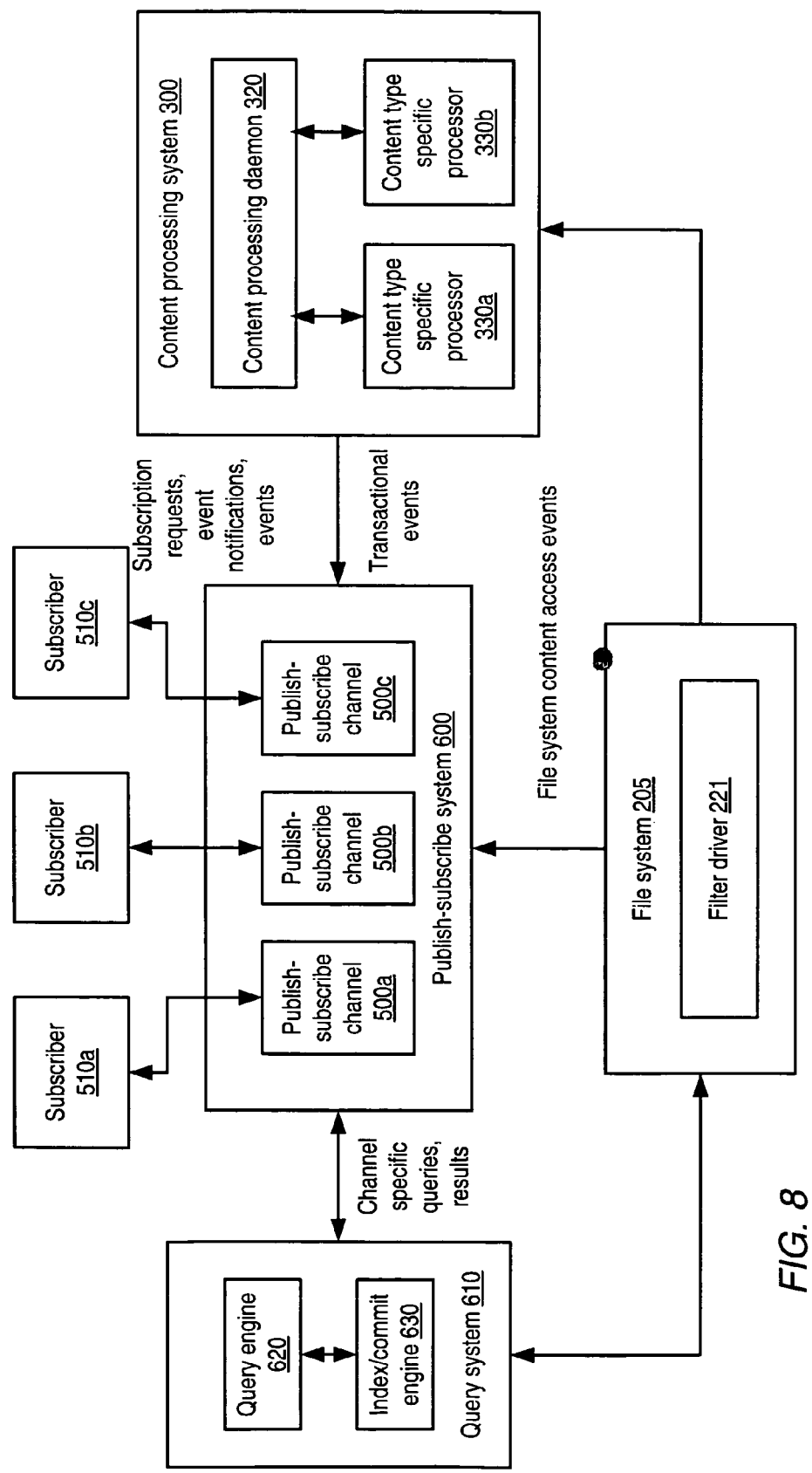
FIG. 8 is a block diagram illustrating one embodiment of a system configured to selectively publish transactional events to publish-subscribe channels dependent upon evaluation of queries.

During execution on a given host device 20, either the operating system or a given application may generate requests for data to be loaded from or stored to a given storage device 30. For example, code corresponding to portions of the operating system or an application itself may be stored on a given storage device 30, so in response to invocation of the desired operation system routine or application program, the corresponding code may be retrieved for execution. Similarly, operating system or application execution may produce data to be stored In some embodiments, the movement and processing of data stored on storage devices 30 may be managed by a software-based storage management system. One such embodiment is illustrated in FIG. 2, which shows an application layer 100 interfacing to a plurality of storage devices 230A-C via a storage management system 200. Some modules illustrated within FIG. 2 may be configured to execute in a user execution mode or "user space", while others may be configured to execute in a kernel execution mode or "kernel space." In the illustrated embodiment, application layer 100 includes a plurality of user space software processes 112A-C. Each process interfaces to kernel space storage management system 200 via an application programming interface (API) 114. In turn, storage management system 200 interfaces to storage devices 230A-C. In some embodiments, as described in greater detail below in conjunction with the descriptions of FIGS. 6 and 8, additional software systems may be provided between or in addition to application layer 100 and storage management system 200. It is contemplated that in some embodiments, an arbitrary number of processes 112 and/or storage devices 230 may be implemented.

In one embodiment, each of processes 112 may correspond to a given user application, and each may be configured to access storage devices 230A-C through calls to API 114. API 114 provides processes 112 with access to various components of storage management system 200. For example, in one embodiment API 114 may include function calls exposed by storage management system 200 that a given process 112 may invoke, while in other embodiments API 114 may support other types of interprocess communication. In one embodiment, storage devices 230 may be illustrative of storage devices 30 of FIG. 1. Additionally, in one embodiment, any of the components of storage management system 200 and/or any of processes 112 may be configured to execute on one or more host devices 20 of FIG. 1, for example as program instructions and data stored within a computer-accessible medium such as system memory 25 of FIG. 1.

Storage Management System and File System

As just noted, in some embodiments storage management system 200 may provide data and control structures for organizing the storage space provided by storage devices 230 into files. In various embodiments, the data structures may include one or more tables, lists, or other records configured to store information such as, for example, the identity of each file, its location within storage devices 230 (e.g., a mapping to a particular physical location within a particular storage device), as well as other information about each file as described in greater detail below. Also, in various embodiments, the control structures may include executable routines for manipulating files, such as, for example, function calls for changing file identities and for modifying file content. Collectively, these data and control structures may be referred to herein as a file system, and the particular data formats and protocols implemented by a given file system may be referred to herein as the format of the file system.

In some embodiments, a file system may be integrated into an operating system such that any access to data stored on storage devices 230 is governed by the control and data structures of the file system. Different operating systems may implement different native file systems using different formats, but in some embodiments, a given operating system may include a file system that supports multiple different types of file system formats, including file system formats native to other operating systems. In such embodiments, the various file system formats supported by the file system may be referred to herein as local file systems. Additionally, in some embodiments, a file system may be implemented using multiple layers of functionality arranged in a hierarchy, as illustrated in FIG. 3.

Figure 3:
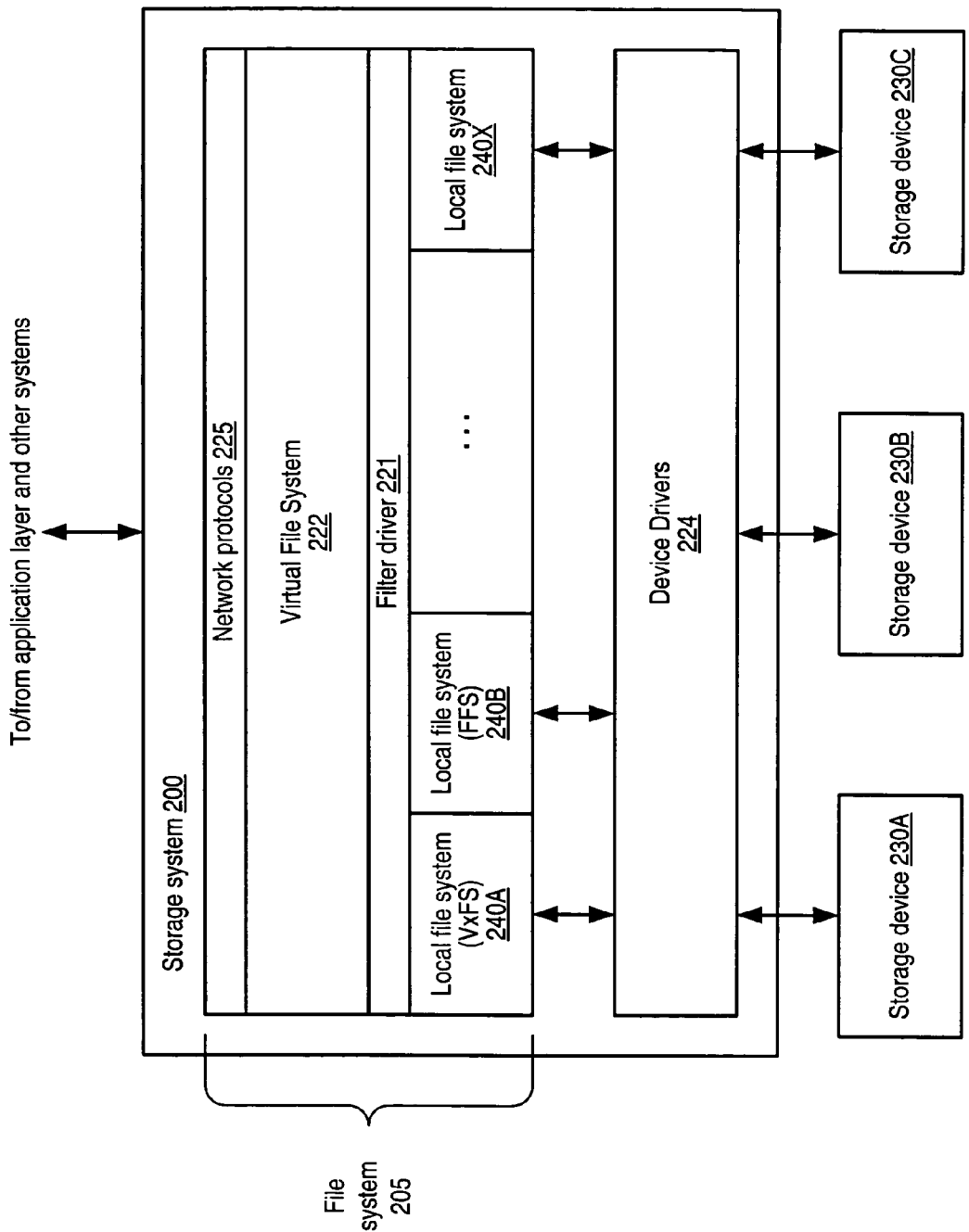
FIG. 3 is a block diagram illustrating one embodiment of a storage management system.

FIG. 3 illustrates one embodiment of storage management system 200. In the illustrated embodiment, storage management system includes a file system 205 configured to interface with one or more device drivers 224, which are in turn configured to interface with storage devices 230. As illustrated within storage system 150 of FIG. 2, the components of storage management system 200 may be configured to execute in kernel space; however, it is contemplated that in some embodiments, some components of storage management system 200 may be configured to execute in user space. Also, in one embodiment, any of the components of storage management system 200 may be configured to execute on one or more host devices 20 of FIG. 1, for example as program instructions and data stored within a computer-accessible medium such as system memory 25 of FIG. 1.

As described above with respect to system 10 of FIG. 1, a given host device 20 may reside in a different computer system from a given storage device 30, and may access that storage device via a network. Likewise, with respect to storage management system 200, in one embodiment a given process such as process 112A may execute remotely and may access storage devices 230 over a network. In the illustrated embodiment, file system 205 includes network protocols 225 to support access to the file system by remote processes. In some embodiments, network protocols 225 may include support for the Network File System (NFS) protocol or the Common Internet File System (CIFS) protocol, for example, although it is contemplated that any suitable network protocol may be employed, and that multiple such protocols may be supported in some embodiments.

File system 205 may be configured to support a plurality of local file systems. In the illustrated embodiment, file system 205 includes a VERITAS (VxFS) format local file system 240A, a Berkeley fast file system (FFS) format local file system 240B, and a proprietary (X) format local file system 240X. However, it is contemplated that in other embodiments, any number or combination of local file system formats may be supported by file system 205. To provide a common interface to the various local file systems 240, file system 205 includes a virtual file system 222. In one embodiment, virtual file system 222 may be configured to translate file system operations originating from processes 112 to a format applicable to the particular local file system 240 targeted by each operation. Additionally, in the illustrated embodiment storage management system 200 includes device drivers 224 through which local file systems 240 may access storage devices 230. Device drivers 224 may implement data transfer protocols specific to the types of interfaces employed by storage devices 230. For example, in one embodiment device drivers 224 may provide support for transferring data across SCSI and ATAPI interfaces, though in other embodiments device drivers 224 may support other types and combinations of interfaces.

In the illustrated embodiment, file system 205 also includes filter driver 221. In some embodiments, filter driver 221 may be configured to monitor each operation entering file system 205 and, subsequent to detecting particular types of operations, to cause additional operations to be performed or to alter the behavior of the detected operation. For example, in one embodiment filter driver 221 may be configured to combine multiple write operations into a single write operation to improve file system performance. In another embodiment, filter driver 221 may be configured to compute a signature of a file subsequent to detecting a write to that file. In still another embodiment, filter driver 221 may be configured to store and/or publish information, such as records, associated with particular files subsequent to detecting certain kinds of operations on those files, as described in greater detail below. It is contemplated that in some embodiments, filter driver 221 may be configured to implement one or more combinations of the aforementioned operations, including other filter operations not specifically mentioned.

An embodiment of filter driver 221 that is configured to detect file system operations as they are requested or processed may be said to perform "in-band" detection of such operations. Alternatively, such detection may be referred to as being synchronous with respect to occurrence of the detected operation or event. In some embodiments, a processing action taken in response to in-band detection of an operation may affect how the operation is completed. For example, in-band detection of a file read operation might result in cancellation of the operation if the source of the operation is not sufficiently privileged to access the requested file. In some embodiments, in-band detection of an operation may not lead to any effect on the completion of the operation itself, but may spawn an additional operation, such as to record the occurrence of the detected operation in a metadata record as described below.

By contrast, a file system operation or event may be detected subsequent to its occurrence, such that detection may occur after the operation or event has already completed. Such detection may be referred to as "out of band" or asynchronous with respect to the detected operation or event. For example, a user process 112 may periodically check a file to determine its length. The file length may have changed at any time since the last check by user process 112, but the check may be out of band with respect to the operation that changed the file length. In some instances, it is possible for out of band detection to fail to detect certain events. Referring to the previous example, the file length may have changed several times since the last check by user process 112, but only the last change may be detected.

It is noted that although an operation or event may be detected in-band, an action taken in response to such detection may occur either before or after the detected operation completes. Referring to the previous example, in one embodiment each operation to modify the length of the checked file may be detected in-band and recorded. User process 112 may be configured to periodically inspect the records to determine the file length. Because length-modifying operations were detected and recorded in-band, user process 112 may take each such operation into account, even though it may be doing so well after the occurrence of these operations.

It is noted that filter driver 221 is part of file system 205 and not an application or process within user space 210. Consequently, filter driver 221 may be configured to operate independently of applications and processes within the user space 210. Alternatively, or in addition to the above, filter driver 221 may be configured to perform operations in response to requests received from applications or processes within the user space 210.

It is further noted that in some embodiments, kernel space 220 may include processes (not shown) that generate accesses to storage devices 230, similar to user space processes 112. In such embodiments, processes executing in kernel space 220 may be configured to access file system 205 through a kernel-mode API (not shown), in a manner similar to user space processes 112. Thus, in some embodiments, all accesses to storage devices 230 may be processed by file system 205, regardless of the type or space of the process originating the access operation.

Numerous alternative embodiments of storage management system 200 and file system 205 are possible and contemplated. For example, file system 205 may support different numbers and formats of local file systems 240, or only a single local file system 240. In some embodiments, network protocol 225 may be omitted or integrated into a portion of storage management system 200 external to file system 205. Likewise, in some embodiments virtual file system 222 may be omitted or disabled, for example if only a single local file system 240 is in use. Additionally, in some embodiments filter driver 221 may be implemented within a different layer of file system 205. For example, in one embodiment, filter driver 221 may be integrated into virtual file system 222, while in another embodiment, an instance of filter driver 221 may be implemented in each of local file systems 240.

Files and Metadata

As described above, file system 205 may be configured to manage access to data stored on storage devices 230, for example as a plurality of files stored on storage devices 230. In many embodiments, each stored file may have an associated identity used by the file system to distinguish each file from other files. In one embodiment of file system 205, the identity of a file may be a file name, which may for example include a string of characters such as "filename.txt". However, in embodiments of file system 205 that implement a file hierarchy, such as a hierarchy of folders or directories, all or part of the file hierarchy may be included in the file identity. For example, a given file named "file1.txt" may reside in a directory "smith" that in turn resides in a directory "users". The directory "users" may reside in a directory "test1" that is a top-level or root-level directory within file system 205. In some embodiments, file system 205 may define a single "root directory" to include all root-level directories, where no higher-level directory includes the root directory. In other embodiments, multiple top-level directories may coexist such that no higher-level directory includes any top-level directory. The names of the specific folders or directories in which a given file is located may be referred to herein as the given file's path or path name.

In some embodiments of file system 205 that implement a file hierarchy, a given file's identity may be specified by listing each directory in the path of the file as well as the file name. Referring to the example given above, the identity of the given instance of the file named "file1.txt" may be specified as "/test1/users/smith/file1.txt". It is noted that in some embodiments of file system 205, a file name alone may be insufficient to uniquely identify a given file, whereas a fully specified file identity including path information may be sufficient to uniquely identify a given file. There may, for example, exist a file identified as "/test2/users/smith/file1.txt" that, despite sharing the same file name as the previously mentioned file, is distinct by virtue of its path. It is noted that other methods of representing a given file identity using path and file name information are possible and contemplated. For example, different characters may be used to delimit directory/folder names and file names, or the directory/folder names and file names may be specified in a different order.

The files managed by file system 205 may store application data or program information, which may collectively be referred to as file data, in any of a number of encoding formats. For example, a given file may store plain text in an ASCII-encoded format or data in a proprietary application format, such as a particular word processor or spreadsheet encoding format. Additionally, a given file may store video or audio data or executable program instructions in a binary format. It is contemplated that numerous other types of data and encoding formats, as well as combinations of data and encoding formats, may be used in files as file data.

In addition to managing access to storage devices, the various files stored on storage devices, and the file data in those files as described above, in some embodiments file system 205 may be configured to store information corresponding to one or more given files, which information may be referred to herein as metadata. Generally speaking, metadata may encompass any type of information associated with a file. In various embodiments, metadata may include information such as (but not limited to) the file identity, size, ownership, and file access permissions. Metadata may also include free-form or user-defined data such as records corresponding to file system operations, as described in greater detail below. In some embodiments, the information included in metadata may be predefined (i.e., hardcoded) into file system 205, for example as a collection of metadata types defined by a vendor or integrator of file system 205. In other embodiments, file system 205 may be configured to generate new types of metadata definitions during operation. In still other embodiments, one or more application processes 112 external to file system 205 may define new metadata to be managed by file system 205, for example via an instance of API 114 defined for that purpose. It is contemplated that combinations of such techniques of defining metadata may be employed in some embodiments. Metadata corresponding to files (however the metadata is defined) as well as the data content of files may collectively be referred to herein as file system content.

Figure 4:
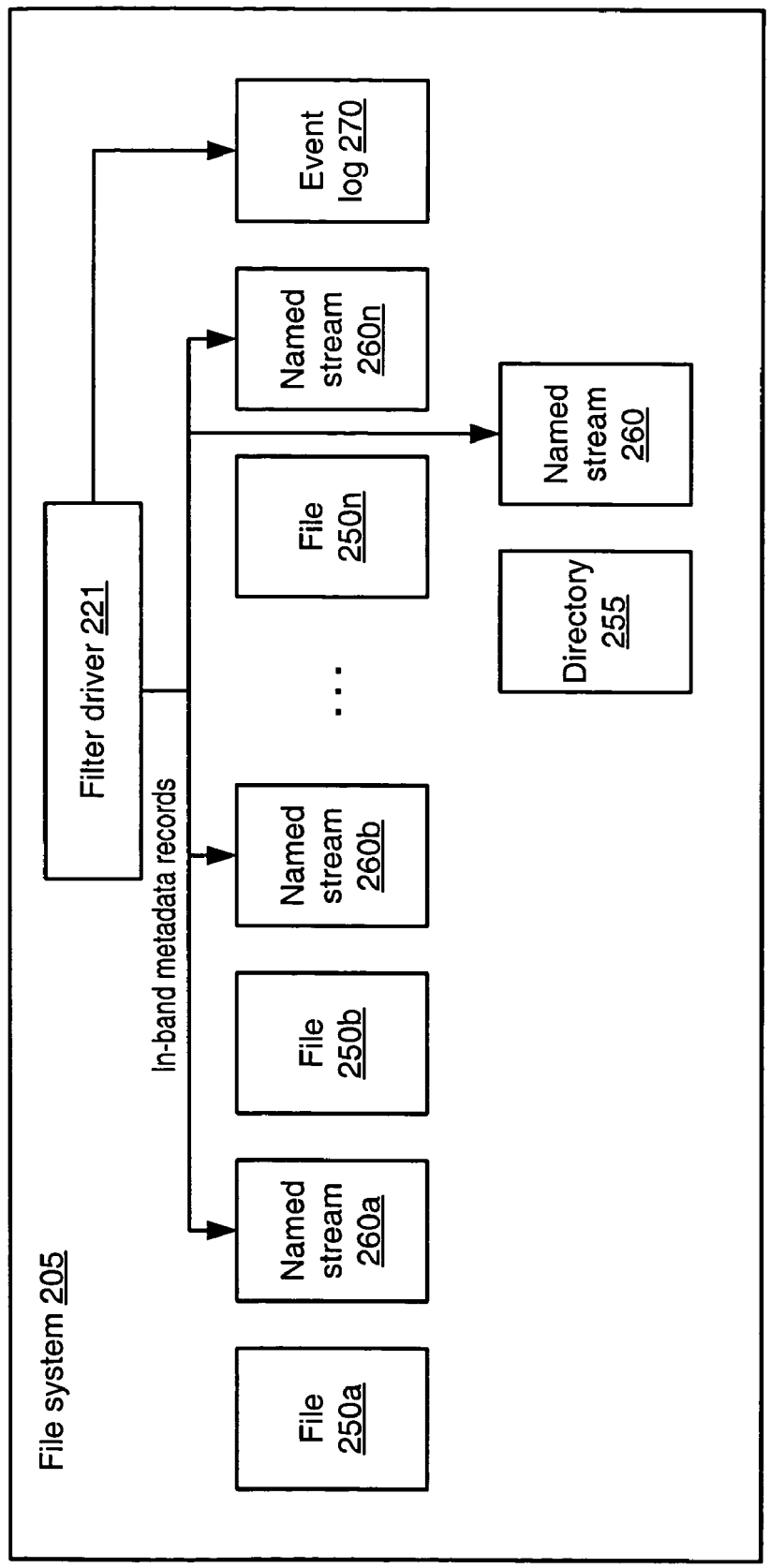
FIG. 4 is a block diagram illustrating one embodiment of a file system configured to store files and associated metadata.

FIG. 4 illustrates one embodiment of a file system configured to store files and associated metadata (i.e., to store file system content). The embodiment of file system 205 shown in FIG. 4 may include those elements illustrated in the embodiment of FIG. 3; however, for sake of clarity, some of these elements are not shown. In the illustrated embodiment, file system 205 includes filter driver 221, an arbitrary number of files 250a-n, a directory 255, a respective named stream 260a-n associated with each of files 250a-n, a respective named stream 260 associated with directory 255, and an event log 270. It is noted that a generic instance of one of files 250a-n or named streams 260a-n may be referred to respectively as a file 250 or a named stream 260, and that files 250a-n and named streams 260a-n may be referred to collectively as files 250 and named streams 260, respectively. As noted above, files 250 and named streams 260 may collectively be referred to as file system content. In some embodiments, directory 255 may also be included as part of file system content.

Files 250 may be representative of files managed by file system 205, and may in various embodiments be configured to store various types of data and program instructions as described above. In hierarchical implementations of file system 205, one or more files 250 may be included in a directory 255 (which may also be referred to as a folder). In various embodiments, an arbitrary number of directories 255 may be provided, and some directories 255 may be configured to hierarchically include other directories 255 as well as files 250. In the illustrated embodiment, each of files 250 and directory 255 has a corresponding named stream 260. Each of named streams 260 may be configured to store metadata pertaining to its corresponding file. It is noted that files 250, directory 255 and named streams 260 may be physically stored on one or more storage devices, such as storage devices 230 of FIG. 2. However, for purposes of illustration, files 250, directory 255 and named streams 260 are shown as conceptually residing within file system 205. Also, it is contemplated that in some embodiments directory 255 may be analogous to files 250 from the perspective of metadata generation, and it is understood that in such embodiments, references to files 250 in the following discussion may also apply to directory 255.

In some embodiments, filter driver 221 may be configured to access file data stored in a given file 250. For example, filter driver 221 may be configured to detect read and/or write operations received by file system 205, and may responsively cause file data to be read from or written to a given file 250 corresponding to the received operation. In some embodiments, filter driver 221 may be configured to generate in-band metadata corresponding to a given file 250 and to store the generated metadata in the corresponding named stream 260. For example, upon detecting a file write operation directed to given file 250, filter driver 221 may be configured to update metadata corresponding to the last modified time of given file 250 and to store the updated metadata within named stream 260. Also, in some embodiments filter driver 221 may be configured to retrieve metadata corresponding to a specified file on behalf of a particular application.

Metadata may be generated in response to various types of file system activity initiated by processes 112 of FIG. 2. In some embodiments, the generated metadata may include records of arbitrary complexity. For example, in one embodiment filter driver 221 may be configured to detect various types of file manipulation operations such as file create, delete, rename, and/or copy operations as well as file read and write operations. In some embodiments, such operations may be detected in-band as described above. After detecting a particular file operation, filter driver 221 may be configured to generate a record of the operation and store the record in the appropriate named stream 260 as metadata of the file 250 targeted by the operation.

More generally, any operation that accesses any aspect of file system content, such as, for example, reading or writing of file data or metadata, or any or the file manipulation operations previously mentioned, may be referred to as a file system content access event. In one embodiment, filter driver 221 may be configured to generate a metadata record in response to detecting a file system content access event. It is contemplated that in some embodiments, access events targeting metadata may themselves generate additional metadata. As described in greater detail below, in the illustrated embodiment, event log 270 may be configured to store records of detected file system content access events independently of whether additional metadata is stored in a particular named stream 260 in response to event detection.

The stored metadata record may in various embodiments include various kinds of information about the file 250 and the operation detected, such as the identity of the process generating the operation, file identity, file type, file size, file owner, and/or file permissions, for example. In one embodiment, the record may include a file signature indicative of the content of file 250. A file signature may be a hash-type function of all or a portion of the file contents and may have the property that minor differences in file content yield quantifiably distinct file signatures. For example, the file signature may employ the Message Digest 5 (MD5) algorithm, which may yield different signatures for files differing in content by as little as a single bit, although it is contemplated that any suitable signature-generating algorithm may be employed. The record may also include additional information other than or instead of that previously described.

In one embodiment, the metadata record stored by filter driver 221 subsequent to detecting a particular file operation may be generated and stored in a format that may include data fields along with tags that describe the significance of an associated data field. Such a format may be referred to as a "self-describing" data format. For example, a data element within a metadata record may be delimited by such tag fields, with the generic syntax:

<descriptive_tag>data element</descriptive_tag> where the "descriptive_tag" delimiter may describe some aspect of the "data element" field, and may thereby serve to structure the various data elements within a metadata record. It is contemplated that in various embodiments, self-describing data formats may employ any of a variety of syntaxes, which may include different conventions for distinguishing tags from data elements.

Self-describing data formats may also be extensible, in some embodiments. That is, the data format may be extended to encompass additional structural elements as required. For example, a non-extensible format may specify a fixed structure to which data elements must conform, such as a tabular row-and-column data format or a format in which the number and kind of tag fields is fixed. By contrast, in one embodiment, an extensible, self-describing data format may allow for an arbitrary number of arbitrarily defined tag fields used to delimit and structure data. In another embodiment, an extensible, self-describing data format may allow for modification of the syntax used to specify a given data element. In some embodiments, an extensible, self-describing data format may be extended by a user or an application while the data is being generated or used.

In one embodiment, Extensible Markup Language (XML) format, or any data format compliant with any version of XML, may be used as an extensible, self-describing format for storing metadata records, although it is contemplated that in other embodiments, any suitable format may be used, including formats that are not extensible or self-describing. XML-format records may allow arbitrary definition of record fields, according to the desired metadata to be recorded. One example of an XML-format record is as follows:

```
<record sequence="1">
    <path>/test1/foo.pdf</path>
    <type>application/pdf</type>
    <user id=1598>username</user>
    <group id=119>groupname</group>
    <perm>rw-r--r--</perm>
    <md5>d41d8cd98f00b204e9800998ecf8427e</md5>
    <size>0</size>
</record>
```

Such a record may be appended to the named stream (for example, named stream 260a) associated with the file (for example, file 250a) having the file identity "/test1/foo.pdf" subsequent to, for example, a file create operation. In this case, the number associated with the "record sequence" field indicates that this record is the first record associated with file 250a. The "path" field includes the file identity, and the "type" field indicates the file type, which in one embodiment may be provided by the process issuing the file create operation, and in other embodiments may be determined from the extension of the file name or from header information within the file, for example. The "user id" field records both the numerical user id and the textual user name of the user associated with the process issuing the file create operation, and the "group id" field records both the numerical group id and the textual group name of that user. The "perm" field records file permissions associated with file 250a in a format specific to the file system 205 and/or the operating system. The "md5" field records an MD5 signature corresponding to the file contents, and the "size" field records the length of file 250a in bytes. It is contemplated that in alternative embodiments, filter driver 221 may store records corresponding to detected operations where the records include more or fewer fields, as well as fields having different definitions and content. It is also contemplated that in some embodiments filter driver 221 may encapsulate data read from a given file 250 within the XML format, such that read operations to files may return XML data regardless of the underlying file data format. Likewise, in some embodiments filter driver 221 may be configured to receive XML format data to be written to a given file 250. In such an embodiment, filter driver 221 may be configured to remove XML formatting prior to writing the file data to given file 250.

It is noted that in some embodiments, metadata may be stored in a structure other than a named stream. For example, in one embodiment metadata corresponding to one or more files may be stored in another file in a database format or another format. Also, it is contemplated that in some embodiments, other software modules or components of file system 205 may be configured to generate, store, and/or retrieve metadata. For example, the metadata function of filter driver 221 may be incorporated into or duplicated by another software module.

In the illustrated embodiment, file system 205 includes event log 270. Event log 270 may be a named stream similar to named streams 260; however, rather than being associated with a particular file, event log 270 may be associated directly with file system 205. In some embodiments, file system 205 may include only one event log 270, while in other embodiments, more than one event log 270 may be provided. For example, in one embodiment of file system 205 including a plurality of local file systems 240 as illustrated in FIG. 2, one history stream per local file system 240 may be provided.

In some embodiments, filter driver 221 may be configured to store a metadata record in event log 270 in response to detecting a file system operation or event. For example, a read or write operation directed to a particular file 250 may be detected, and subsequently filter driver 221 may store a record indicative of the operation in event log 270. In some embodiments, filter driver 221 may be configured to store metadata records within event log 270 regardless of whether a corresponding metadata record was also stored within a named stream 260. In some embodiments event log 270 may function as a centralized history of all detected operations and events transpiring within file system 205.

Similar to the records stored within named stream 260, the record stored by filter driver 221 in event log 270 may in one embodiment be generated in an extensible, self-describing data format such as the Extensible Markup Language (XML) format, although it is contemplated that in other embodiments, any suitable format may be used. As an example, a given file 250a named "/test1/foo.pdf" may be created, modified, and then renamed to file 250b "/test1/destination.pdf" in the course of operation of file system 205. In one embodiment, event log 270 may include the following example records subsequent to the rename operation:

```
<record>
    <op>create</op>
    <path>/test1/foo.pdf</path>
</record>
<record>
    <op>modify</op>
    <path>/test1/foo.pdf</path>
</record>
<record>
    <op>rename</op>
    <path>/test1/destination.pdf</path>
    <oldpath>/test1/foo.pdf</oldpath>
</record>
```

In this example, the "op" field of each record indicates the operation performed, while the "path" field indicates the file identity of the file 250a operated on. In the case of the file rename operation, the "path" field indicates the file identity of the destination file 250b of the rename operation, and the "oldpath" field indicates the file identity of the source file 250a. It is contemplated that in alternative embodiments, filter driver 221 may store within event log 270 records including more or fewer fields, as well as fields having different definitions and content.

Events and Publish-Subscribe Channels

As described above, in various embodiments different types of file system content access events may occur during the course of operation of file system 205, and such events may be recorded in a variety of ways, such as in named streams, an event log, or through other techniques or structures. In some embodiments, an application (such as may be represented by one or more of processes 112) may be interested not only in file system content itself (e.g., file data), but also in events relevant to file system content. That is, an application may be interested in the dynamics of file system content, and may take various actions depending on whether particular file system content is created, deleted, or modified in a particular way. For example, a user may wish to be notified via an application if a file system content access event occurs that results in modification of a spreadsheet such that a revenue figure stored in a particular spreadsheet cell exceeds a predetermined value.

In some embodiments, applications interested in file system content or content-related events may be configured to execute on the same computer system as the file system managing the content and/or events, while in other embodiments, some such applications may be configured to execute on a different computer system and to communicate with the file system via a network or other type of interconnect. In a system employing a conventional request/response model for interfacing applications to other processes or entities (such as storage management system 200 or file system 205), an application may make a synchronous request for information, such as content access event information, from a source such as file system 205, for example. If the information source executes on a remote system with respect to the requesting application, the application may further need to specifically identify the remote system (such as by determining the Internet Protocol (IP) address of the remote system) and to direct its request to the remote system using appropriate programming conventions and communication protocols. For example, the application may invoke a Remote Procedure Call (RPC) that results in the information request being transmitted to the identified remote system via a transport protocol such as Transmission Control Protocol (TCP). Typically, such a request is made synchronously, such that the requesting application waits for an eventual response from the remote system before proceeding.

The conventional synchronous request/response programming model may present several challenges, particularly in conveying event-oriented information to interested recipients. For example, each requesting application may need to submit a request to the information source, which may be redundant if multiple applications are requesting information about the same events or if no new events have occurred since the last request was made. Requiring a requestor to track the specific identity of an information source (e.g., to perform an RPC) may add programming and execution overhead to the requesting application. Further, performance may suffer if the requesting application synchronously waits for a response from the source, particularly if no new information is conveyed by the response. Additionally, if a request or a response is lost in transit, for example due to a communications failure or a failure of the system hosting the requested source, a requesting application could experience deadlock or malfunction.

Alternatively, in one embodiment, applications may be configured to receive information about file system content access events using a publish-subscribe programming model. Generally speaking, a publish-subscribe programming model may provide for asynchronous transfer of information from a source to a recipient. Specifically, in a typical publish-subscribe model, a source (or "publisher") may publish, or make available, different types of information to which individual recipients ("subscribers") may subscribe. Subscribers may receive only those types of information to which they have subscribed. Further, in some instances subscribers may receive such information in response to its publication, without specifically making a request for that information. It is contemplated that in some embodiments, an application, system or other entity may be a publisher with respect to some information and a subscriber with respect to other information.

In some publish-subscribe programming model embodiments, publish-subscribe channels (or simply "channels") may be used to mediate information transfer between publishers and subscribers. Generally speaking, a publish-subscribe channel may be a software entity configured to receive information published by a publisher and to notify subscribers of the availability of published information. In some embodiments, a publish-subscribe channel may include queuing or other storage functionality configured to store published information before it is delivered to subscribers. In various embodiments, a publish-subscribe channel may deliver published information to subscribers directly in response to publication, or the channel may deliver a notification or indication of new publications and may deliver the actual published information in response to a request by the subscriber. A channel may also be configured to archive publications for a period of time, so that a new subscriber may be able to retrieve information that was published prior to subscription.

In one embodiment, different channels may correspond to different categories or types of information to which a subscriber may subscribe. For example, a newspaper's web server may publish stories corresponding to one or more different categories such as "news," "sports," and "business." Each category may have a corresponding channel to which users may subscribe through an application, such as a publish-subscribe-aware web browser or aggregator. When the web server publishes a given story, the story may be placed in the appropriate channel or channels. Responsively, upon receiving the story, a given channel may notify subscribers to that channel that new content is available, and/or may deliver that content directly to subscribers. In some embodiments, multiple publishers may be configured to publish information to a single set of channels.

In some embodiments of publish-subscribe channels, publishers may not be aware of what subscribers are receiving published information; the publish-subscribe system including the channels may be configured to manage subscriber information. Similarly, subscribers need not precisely identify publishers in order to receive information, as is often the case in the request/response model. Further, the publisher need not necessarily be available at the time the subscriber receives published information, or vice versa. The channel may serve to decouple content delivery such that neither publisher nor subscriber is waiting for action on the part of the other.

Information conveyed by the channel from publishers to subscribers may be formatted according to any suitable protocol. For example, in one embodiment published information may be stored in a data format compliant with a version of the Extensible Markup Language (XML) format, although other formats such as Hypertext Markup Language (HTML), Rich Text Format (RTF) or other standard or proprietary formats are also contemplated. Additionally, the channel may use a particular syndication protocol to manage published information, subscription information, etc. For example, in one embodiment a channel may be compliant with a version of Resource Description Framework (RDF) Site Summary (RSS) protocol, such as RSS 0.9x, RSS 1.0, RSS 2.0, or another suitable syndication protocol.

Figure 5:
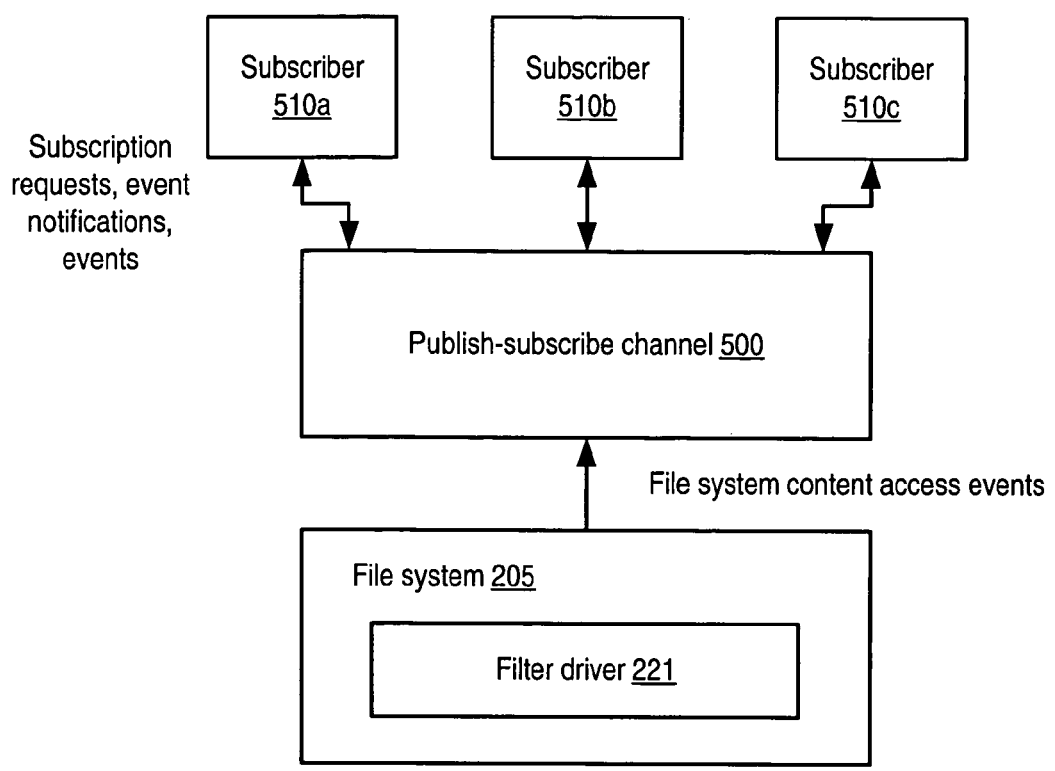
FIG. 5 is a block diagram illustrating one embodiment of a file system configured to publish records of file system content access events to a publish-subscribe channel.

FIG. 5 illustrates one embodiment of a file system configured to publish records of file system content access events to a publish-subscribe channel. In the illustrated embodiment, file system 205 is configured to publish such event records to publish-subscribe channel 500 (or simply, channel 500). Additionally, a plurality of subscribers 510*a-c* are configured to interact with channel 500 to subscribe to the channel's contents, to receive notification of events published by file system 205, and to receive the events themselves. Subscribers 510*a-c* may be illustrative of any of processes 112 illustrated within application layer 100 of FIG. 2. More generally, subscribers 510*a-c* may be any application or process, whether user-level or kernel-level, that is configurable to interact with channel 500 via an appropriate protocol (such as RSS, for example). Although three subscribers 510 are shown in FIG. 5, it is contemplated that in various embodiments more or fewer subscribers may be employed. Additionally, in some embodiments additional instances of file system 205 may be configured to publish events to a single channel 500, or to respective instances of channel 500.

As described previously, in some embodiments file system 205 may be configured to detect various types of file system content access events. For example, filter driver 221 may be configured to perform in-band detection of such events as file open, close, create, delete, modify or rename operations, or other operations. In response to detection of such an event, file system 205 may be configured to publish a record of the event to publish-subscribe channel 500. For example, filter driver 221 may be configured to generate an XML record of the event similar to the record created for storage in event log 270, described above. Rather than storing the record in an event log, however, filter driver 221 (or another component of file system 205) may be configured to invoke a publication API or other mechanism exposed by channel 500, through which the record corresponding to the detected event may be conveyed to the channel.

After receiving a record of a file system content access event from file system 205, channel 500 may store the record internally, for example in a queue. Additionally, channel 500 may consult subscription information, which may be maintained internally to the channel in some embodiments or in a central subscription server in other embodiments (e.g., embodiments including multiple different types of channels 500, such as described in greater detail below). In one embodiment, channel 500 may send a notification to each subscriber 510 indicating that one or more file system content access events have been published and are available, but may not send the event records themselves until a given subscriber 510 sends an explicit request. In another embodiment, channel 500 may attempt immediate delivery of event records to subscribers 510 without waiting for a subscriber request. Channel 500 may retain a given record internally until it has been delivered to each subscriber 510 known to channel 500, after which channel 500 may delete the event record or retain it indefinitely.

In some cases, not all subscribers 510 may be available at the time channel 500 attempts to send an event record or an event notification. For example, a computer system hosting a given subscriber 510 may fail or be disconnected from a network. In some embodiments, channel 500 may maintain state information corresponding to each subscriber 510 indicative of the published events that have successfully been delivered to each subscriber 510. For example, channel 500 may associate a timestamp with each event published by file system 205, where the timestamp identifies the time and/or date of publication. Channel 500 may further store, for each subscriber 510, a timestamp indicative of the last event successfully delivered to that subscriber, and may use such stored timestamps to manage notification and delivery of events to subscribers 510. In an alternative embodiment, each subscriber 510 may maintain its own state information, e.g., a timestamp indicating the last event successfully received, and may convey this timestamp to channel 500 as part of a request for event records. In response to such a request, channel 500 may be configured to deliver those records published more recently than the time indicated by the conveyed timestamp.

It is noted that while in some embodiments, file system 205 may record information about file system content access events in named streams 260 and event log 270 in addition to publishing file system content access events to channel 500, named streams 260 and event log 270 are in no way essential to the publication of such events to channel 500. In some embodiments, it is contemplated that named streams 260 and/or event log 270 may be omitted while the publish-subscribe interface centering around channel 500 may be retained.

Customizing Publish-Subscribe Channels Using Queries

In the embodiment just described, a single channel 500 was illustrated. In one embodiment, file system 205 may be configured to publish all detected file system content access events to channel 500, such that channel 500 serves as a "raw" or unfiltered channel for conveying events to subscribers. (It is noted that in some embodiments, not all possible file system content access events that may occur may be detected for the purposes of publication. For example, file read events may be numerous, and to publish all file read events may consume considerable resources and bandwidth compared to other types of events. Consequently, in one embodiment filter driver 221 may be configured not to publish file read events, or any other particular type of event.)

While having a raw event channel of global scope with respect to file system 205 may be useful for some applications (e.g., performance monitoring, system administration, security or data mining applications), for other applications the majority of events published via a raw channel may be superfluous. For example, some applications may be interested in events pertaining to file system content of a particular type, such as spreadsheet files or word processor document files, for example. Further, some applications may be interested in events pertaining to specific content within a file, such as a spreadsheet cell or a particular section of a text document.

In some embodiments, specific events may be selected for publication to a given channel dependent on whether the events satisfy a query that specifies particular criteria for selection. That is, events may be filtered prior to publication to a specific channel dependent upon various criteria. The available criteria for such query-based filtering may depend on the format in which the file system content access events and/or the underlying file system content is stored. For example, in one embodiment file system content may be stored in a fixed, non-extensible format, such as a tabular data structure where a data item's description is inherited from row and column definitions rather than from a self-describing format tag. Further, events related to such content may also be conveyed in a similar fixed format. In such an embodiment the criteria by which events may be selected may be determined by the defined structure of the format, such as the available row and column definitions. In embodiments where file system content is stored in an extensible, self-describing format, such as the XML format described above, the criteria available for selecting desired file system content may include any of the self-describing features of that content.

Figure 6:
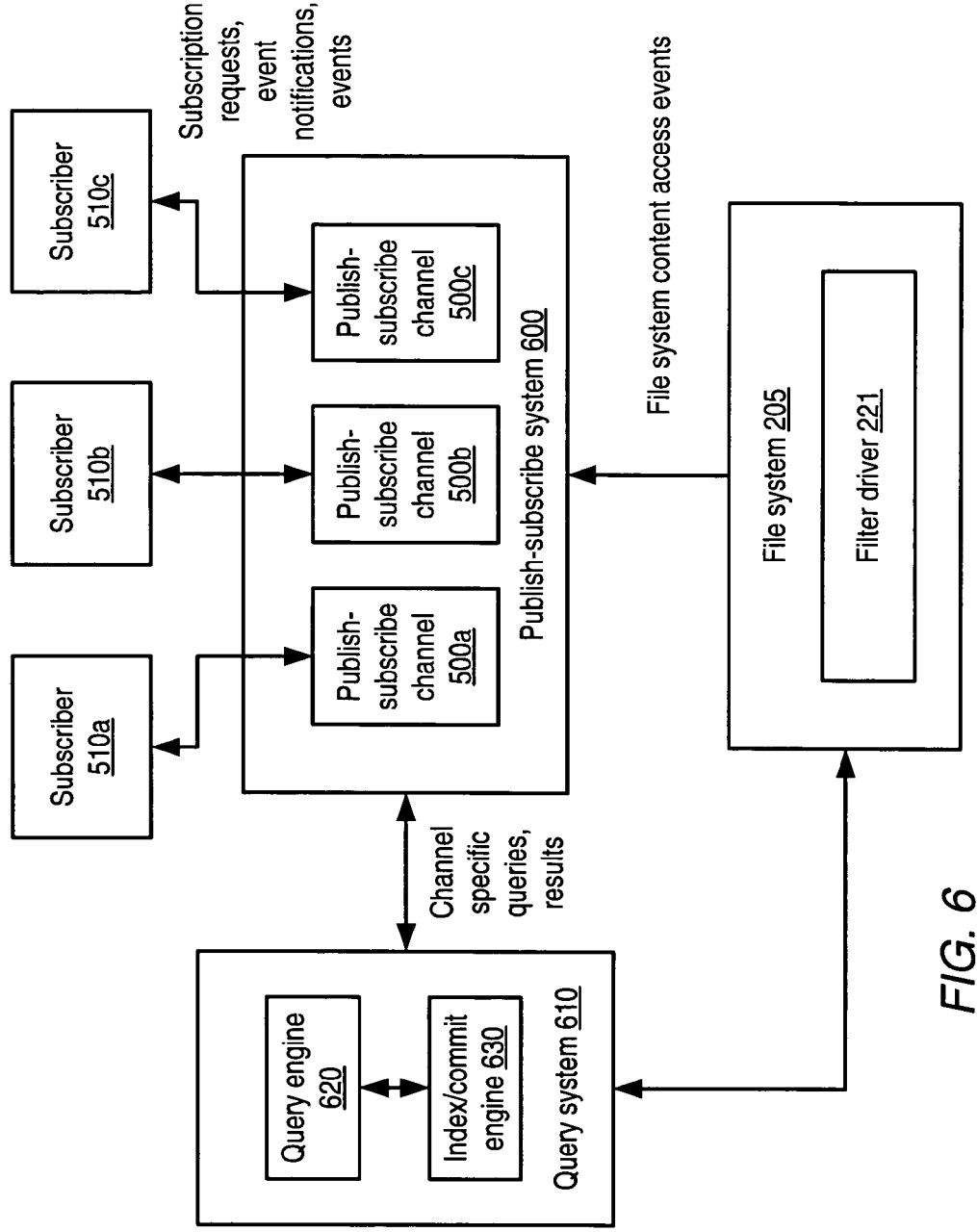
FIG. 6 is a block diagram illustrating one embodiment of a system configured to selectively publish file system content access events to publish-subscribe channels dependent upon evaluation of queries.

One embodiment of a system configured to selectively publish file system content access events to publish-subscribe channels dependent upon evaluation of queries is illustrated in FIG. 6. In the illustrated embodiment, file system 205 may be configured to publish events to a publish-subscribe system 600, which includes a plurality of publish-subscribe channels 500*a-c*. Each channel 500*a-c* has a respective subscriber 510*a-c*, which may be configured similarly to subscribers 510*a-c* described above. Additionally, publish-subscribe system 600 is configured to interact with a query system 610 to filter events for publication to one or more of channels 500. File system 205 may also be configured to convey events and file system content directly to query system 610.

Each of channels 500a-c may be generally illustrative of channel 500. However, in the illustrated embodiment, some or all of channels 500 may be associated with a respective query, where a given event generated by file system 205 may be published to a given channel 500 dependent on whether the given event satisfies a query corresponding to the given channel. In some embodiments, one of channels 500 may be configured as a default or raw channel to which all detected events may be published, as described above in conjunction with the description of FIG. 5. It is noted that in various embodiments, more or fewer channels may be implemented, and that multiple subscribers 510 may subscribe to a given channel 500.

Query system 610 may be configured to evaluate queries on behalf of channels 500. Generally speaking, a query may specify how a subset of data is to be selected from a larger set of data, for example through the evaluation of one or more data fields of a record stored in a self-describing format. For example, a user, via an application, may wish to select all events that correspond to the file /test1/foo.pdf for further analysis. Correspondingly, the user may construct a query that specifies the selection of all events having a data field tagged "path" where the data field equals a particular value, such as "/test1/foo.pdf". A query may specify a particular state or states of file system content in addition to or instead of a particular type of event. For example, a user may be interested in writes of particular data to a set of files. A corresponding query may include specification of a write event as well as content state. In some embodiments, it is contemplated that the entirety of file system content may be queried, including file data stored within files 250 as well as metadata stored within named streams 260, whether generated in-band, e.g., by filter driver 221, or out-of-band, or whether the metadata is defined and/or generated externally to file system 205, e.g. by an application process 112 via API 114.

Queries may be constructed in a query language, which may provide syntactic constructs for the selection of sets of data based on the value of one or more tagged data fields. In some embodiments, a given query language may support procedural features, such as functions, for example, in addition to set-selection features. Further, in some embodiments a given query language may support the embedding within a query of procedural routines coded in other programming languages, such as Java or C, for example. Where the XML format is used to structure file system content, a given application may construct a query to select particular file system content in the XML Query (XQuery) language as specified by the World Wide Web Consortium (W3C) or any future XQuery standard or variant thereof. However, it is contemplated that any suitable query language may be employed.

In the illustrated embodiment, query system 610 further includes query engine 620 and index/commit engine 630. In one embodiment, query engine 620 may be configured to parse and evaluate queries submitted to query system 610 by channels 500. For example, query engine 620 may receive a query corresponding to a given channel 500 that specifies the selection of all word processing document files exceeding a given file size. Query engine 620 may parse the query for syntactic correctness, and may return an error condition if the query is malformed. In some embodiments, query engine 620 may also perform structural transformations to the query, for example to decompose the query into multiple queries and/or to optimize the query for performance. Next, query engine 620 may examine one or more event records (i.e., generated by file system 205) to determine whether the events satisfy the query. For example, query engine 620 may examine metadata records stored in named streams 260 to determine whether a file named in an event record is of the specified document type and size. Query engine 620 may further indicate to publish-subscribe system 600 whether the query has been satisfied. If a given event satisfies a query associated with a given channel 500, a record of the event may be published to given channel 500 as described previously. Numerous implementations of query engine 620 configured for parsing and evaluating queries are possible and contemplated.

In some embodiments, query engine 620 may interact directly with file system 205 (or more generally, with storage management system 200) to access file system content in response to evaluation of a query. However, in some instances, query evaluation performance may be improved by creating one or more indexes of file system content and using these indexes to assist in query evaluation. In the illustrated embodiment, index/commit engine 630 may be configured to generate and maintain these indexes, and to provide index information to query engine 620 during the evaluation of queries.

Generally speaking, an index may be any data structure that organizes a collection of data according to some aspect or attribute, facilitating querying of the data by the indexed aspect or attribute. For example, in one embodiment an index may be a list of names of all files 250 defined with file system 205, organized alphabetically. In some embodiments, multiple indexes of file system content may be employed. For example, if file system content is frequently queried by name, associated user, and content creation/modification time, individual indexes that sort or organize file system content by each of these attributes may be created. In some embodiments, more complex indexing schemes may be employed, including indexes that combine multiple content attributes into complex state spaces. Additionally, it is contemplated that indexes may be implemented using any suitable data structure, including lists, tables, trees, and higher-order data structures.

In some embodiments, query system 610 may include other functionality not shown. For example, in one embodiment query system 610 may be configured to execute on a computer system distinct from that hosting publish-subscribe system 600, and to communicate with multiple computer systems via a network to receive queries for evaluation. In one such embodiment, query system 610 may include connection management functionality configured to authenticate remote applications and to process query requests from multiple source. Also, in some embodiments query system 610 may include data layout management functionality to facilitate the management and storage of indexes. In one embodiment, query system 610 may be configured to provide a generalized query interface accessible directly by applications within application layer 100, in addition to providing query evaluation for publish-subscribe system 600. For example, in one such embodiment query system 610 may logically reside between application layer 100 and storage management system 200 of FIG. 2, and may expose an API 114 through which various applications 112 may query file system content stored via storage management system 200.

Through the association of particular queries with specific channels 500, the set of events conveyed to a given individual subscriber 510 may be narrower in scope than the total set of events published by file system 205. In various embodiments, the evaluation of queries associated with channels 500 may be performed in different ways with respect to event publication. For example, in one embodiment, query evaluation may occur in response to event publication. Specifically, file system 205 may publish events to publish-subscribe system 600. Responsively, publish-subscribe system 600 may convey an indication of a published event (e.g., an XML or other type of record of the event) to query system 610 along with the queries (if any) corresponding to each of channels 500. Query system 610 may then evaluate the queries with respect to the published event (as well as any file system content specified by the query) and may indicate to publish-subscribe system 600 whether any queries have been satisfied. Any channel 500 having a corresponding query satisfied by the event may publish the event to its subscribers 510 as described previously. If a given event satisfies no queries corresponding to channels 500, and there is no raw or default channel 500, the given event may be discarded by publish-subscribe system 600.

In an alternative embodiment, evaluation of queries may occur in response to receiving a request for channel content from one or more subscribers 510. For example, a subscriber 510 may request that any new events be delivered independently of whether that subscriber 510 received a notification that such new events had been published. In one embodiment, publish-subscribe system 600 may store events published by file system 205 in a queue or in a default channel 500. Upon receiving a channel content request from one of subscribers 510, query evaluation as described above may occur with respect to those stored events not yet published to specific channels 500.

In addition to management of channels 500 and interfacing with query system 610 for query evaluation, publish-subscribe system 600 may perform other functions. For example, publish-subscribe system 600 may maintain a database of information pertaining to available channels 500 and associated subscribers 510. Publish-subscribe system 600 may also present an interface to applications whereby applications may determine the channels 500 that are available for subscription and may request the creation of new channels 500 (along with associated filtering queries) if necessary. Additionally, in some embodiments, either publish-subscribe system 600 or individual channels 500 may maintain state information, such as timestamp information corresponding to published events that have been delivered to subscribers 510. Alternatively, an event published to a specific channel 500 may be delivered to a subscriber 510 dependent upon whether the event occurred more recently than a time indicated by a timestamp provided by the subscriber 510.

In the illustrated embodiment, publish-subscribe system 600 has been shown as distinct from query system 610, and state associated with channels 500 (such as a query associated with a channel) may be stored by publish-subscribe system 600 externally to query system 610. However, in some embodiments, channels 500 and their associated state (including subscription information and other management details handled by publish-subscribe system 600) may be implemented directly within query system 610.

Figure 7:
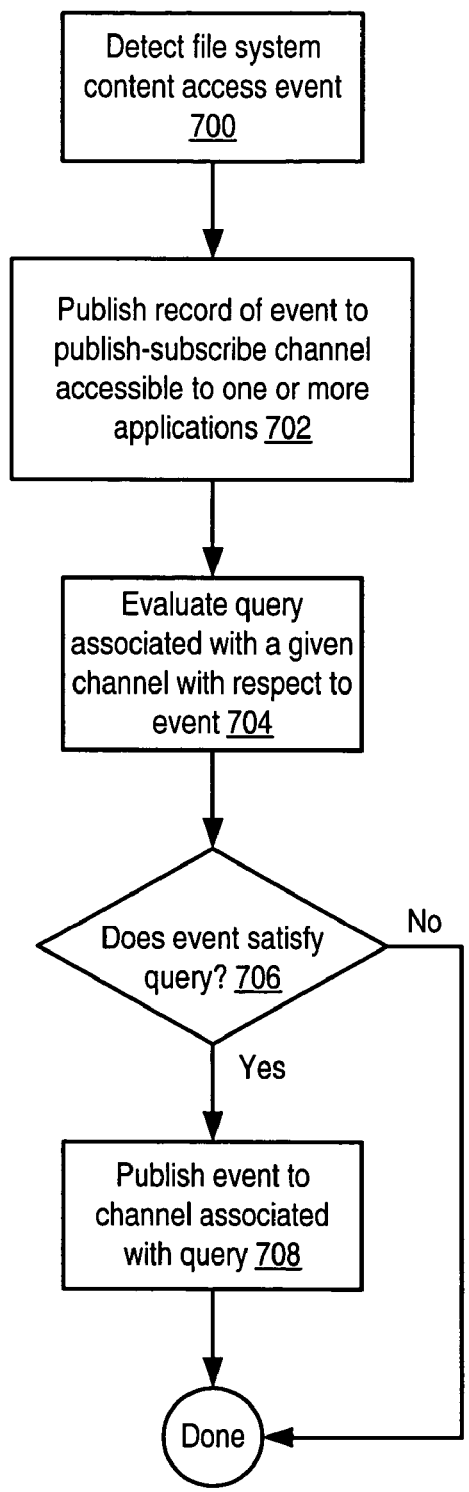
FIG. 7 is a flow diagram illustrating one embodiment of a method of publishing file system events using a publish-subscribe system.

One embodiment of a method of publishing file system content access events using a publish-subscribe system is illustrated in FIG. 7. Referring collectively to FIG. 1 through FIG. 7, operation begins in block 700 where a file system content access event is detected. For example, filter driver 221 may be configured to perform in-band detection of various types of events as described above.

In response to event detection, a record of the event is published to a publish-subscribe channel accessible by one or more applications (block 702). For example, file system 205 may publish the detected event to a default channel 500 (i.e., a channel with no associated query filter) within publish-subscribe system 600. Additionally, default channel 500 may have one or more subscribers 510 as described above. It is contemplated that in some embodiments, unconditional publication of events to a default channel may be omitted. Additionally, as described above, in some embodiments not every detectable event may be published; rather, file system 205 may be configured to publish a subset of all possible event types.

In the illustrated embodiment, a query associated with a given channel is evaluated with respect to the detected event (block 704). For example, one or more channels 500 may be associated with respective queries, which may be conveyed to query system 610 for evaluation with respect to a given event. As described above, such evaluation may occur in response to generation of the event by file system 205, in response to a channel content request from a subscriber 510, or at another suitable time.

In response to determining that the detected event satisfies a particular query (block 706), that event is published to a channel associated with the particular query (block 708). If an event satisfies no query, it may be published to a default channel if one is provided (as in block 702) or not published.

Content Processing System and Transactional Events

As described above, in some embodiments file system 205 may be configured to perform in-band detection of various file system content access events, and to generate metadata and/or publish events in response to such detection. These events may arise, in some instances, as the result of the execution of various application processes. For example, a given application may cause a file to be manipulated in any of various ways (such as opening, closing, reading, writing, copying, renaming, or any other type of file activity) for which a corresponding metadata record may be generated. In such embodiments, the resulting event records may enable the systematic tracking of file system activity generated by a given application or process, where such tracking may be performed to an arbitrary degree of specificity and may be transparent to the application.

In some instances, numerous applications may interact with storage management system 200 as part of a complex, heterogeneous data processing system. For example, an enterprise may use a database application to manage inventory and production, an accounting application to track billing and receipts, a finance application to generate quarterly reporting, and a human resources application to identify personnel details. Additional or different applications may be provided in various embodiments.

Some of these applications may be versions of the same application (for example, accounting and finance may use common or related applications), or they may be tightly coupled applications, i.e., they may be substantially aware of each other's presence and data, such as by sharing a common API through which they may directly communicate and coordinate. For example, upon processing a bill, the accounting application may directly notify the finance application to update a budget. Other applications may be provided by different vendors and may be only loosely coupled, i.e., they may share a common data format, but may possess limited ability to directly communicate and coordinate each other's operation. For example, the finance application may be capable of importing salary and benefits information generated by the human resources application in response to a user's intervention, but may not be capable of directly requesting and receiving that information without some such intervention. Finally, in some cases, certain applications may be entirely incompatible, lacking the ability either to share data or directly interact.

Certain complex enterprise operations may involve not just one, but several applications, not all of which may be tightly coupled to one another. Such operations, which may be referred to as transactions, may include a series of operations to be undertaken by one or more applications in a particular order or in response to a particular event. The series of operations comprising a transaction may also be referred to as the process or procedure implemented by the transaction, and may be arbitrarily defined according to the capabilities of the various applications available. Additionally, a transactional event may be associated with the completion of a transaction or completion of an identified step or state in the process implemented by the transaction. In some embodiments, a transactional event may occur in response to detection of a file system content access event (such as arising from the activity of one or more applications as described below) or to detection of a particular state of file system content, such as a particular data value. Generally, however, transactional events may occur within the context of a particular transaction, whereas file system content access events in themselves may lack transactional context.

The status of a transaction may not be evident from the activity of a single constituent application; rather, the transaction may be a function of the activity of all relevant applications taken together with information regarding the process defining the transaction. For example, depending on the procedure defined in a given enterprise, processing of a purchase order may involve several steps. The purchase order may first be entered, such as through a dedicated application or email interface. Once entered, the identity and authority of the requestor may be validated, such as by verifying that the requestor is an employee with the appropriate signature authority using a human resources application. Subsequently, financial approval may be obtained, which may include using a financial application to verify that the request falls within the budget of the individual or organization requesting the order. Depending on the results of these various steps and the complexity of the enterprise's policy, additional verifications such as management approvals may be obtained. When all requirements are satisfied, the order may be transmitted to a vendor, completing the purchase order transaction process.

Any of the applications functioning in support of a complex transaction may generate activity within storage management system 200 as file system content is manipulated. File system content, including file data and/or metadata records corresponding to the activity, as well as content access events may be generated in response to such activity as described above. However, as previously noted, in some instances, the progress of a given transaction through its defined process (such as may be indicated by transactional events) may not be evident from the activity of a given application as reflected in the file system content corresponding to its activity. For example, a human resources application may reflect personnel data, but not budget data. Consequently, querying the human resources application may result in verification that a given individual has appropriate signature authority for a particular purchase, the result of which querying may be indicated in file system content. However, the human resources application may not be capable of determining whether sufficient budget exists for the purchase. In fact, in some instances any given application, such as the human resources application, may generally be unaware of a broader transactional context for its operation. That is, the application may be unable to distinguish whether a given query is or is not part of the process of a given transaction that may span multiple applications.

To configure each application that may potentially participate in a given transaction to be able to directly interact with other applications may be difficult or impractical. For example, if the functionality of one or more applications is fixed by an external supplier, it may not be possible to perform such configuration. In the embodiment illustrated in FIG. 8, content processing system 300 is added to the system illustrated in FIG. 6. In various embodiments, content processing system 300 may be configured to monitor file system content and related file system content access events stored by file system 205, and to generate transactional events in response to such monitoring. These transactional events may be published to channels 500 of publish-subscribe system 600 in a manner similar to the publication of file system content access events described above.

In the illustrated embodiment, content processing system 300 includes a content processing daemon 320 configured to interact with a plurality of content type specific processors 330*a-b*, which may also be referred to simply as content processors 330. Content processing daemon 320 may be configured to interact with files 250, named streams 260, and event log 270 of file system 205. Additionally, content processing daemon 320 may be configured to interact with publish-subscribe system 600.

In the illustrated embodiment, content processing daemon 320 may be configured to perform out-of-band detection of operations and events that have been detected in-band and recorded by filter driver 221. For example, content processing daemon 320 may occasionally scan event log 270 or a default channel 500 to determine what file system content access events have occurred since the last scan. In response to detected events, content processing daemon 320 may generate transactional events and/or additional file system content as described in greater detail below. In some embodiments, it is contemplated that content processing daemon 320 may scan files 250 and/or named streams 260 directly, while in other embodiments content processing daemon 320 may use event log 270 to access those files 250 and named streams 260 corresponding to recorded events. Additionally, it is contemplated that in some embodiments, content processing system 300 may include its own log of events updated in response to notification by filter driver 221, or may use a default channel 500 configured to record all detected file system content access events, rather than using event log 270.

Content processing daemon 320 may be configured to publish a transactional event determined by one or more of content processors 330. In one embodiment, a content processor 330 may include procedural code or logic configured to monitor the defined process of a particular transaction. For example, a given content processor 330 may implement an algorithm or state machine that describes a sequence of operations and any transactional events defined as part of a particular transaction. A content processor 330 may also include identifying information for the file system content relevant to the transaction, such as particular files 250 that may be accessed during the course of the transaction. Additionally, a content processor 330 may include information to identify the specific applications corresponding to various operations. For example, if a given transaction includes a step to be performed by an accounting application, a corresponding content processor 330 may include the specific application identifying information, such as an application name or identifying code, that may be included in a metadata record generated by filter driver 221 for a given file 250 when that file is accessed by the accounting application.

In some embodiments, a given content processor 330 may be configured to process all instances of a particular transaction. For example, a content processor 330 configured to monitor the purchase order transactions described above may be configured to process all purchase order transactions that are in progress at a given time. In such embodiments, given content processor 330 may include data structures whereby individual transactions may be distinguished within the processor, such as by a timestamp or unique identifier. In other embodiments, each content processor 330 may correspond to a single instance of a given transaction. For example, when a new transaction is detected, a new instance of a content processor 330 may be spawned from an existing instance (such as a template) or from content processing daemon 320. It is contemplated that in some embodiments, content processors 330 and content processing daemon 320 may be implemented as a single processing entity, such as a single software module.

The operation of a given content processor 330 may be determined by the algorithm it implements in combination with file system content access event information received via content processing daemon 320. In one embodiment a content processor 330 may initially be in an inactive or idle state until triggered by a particular file system content access event. For example, in a system where a purchase order is initiated by emailing the purchase order to a particular email account, filter driver 221 may create a metadata record within event log 270 and/or publish an event to publish-subscribe system 600 in response to appending the contents of a received purchase order to a file associated with the particular email account. Subsequently, content processing daemon 320 may detect the record and convey an indication of the record to a purchase order content processor 330, which may responsively activate. In an alternative embodiment, individual instances of content processors 330 may be spawned by content processor daemon 320 in response to detection of an appropriate activating event.

In one embodiment, a content processor 330 may be a passive monitor that functions to detect when a given sequence of file system content access events has transpired or a given state of file system content has occurred. Content processor 330 may responsively publish one or more transactional events to publish-subscribe system 600, which may be published to specific channels 500 dependent upon whether the transactional event satisfies a respective query associated with a given channel 500, as described above. For example, a content processor 330 may be configured to detect whether a sequence of events, such as the steps of an approval process, have been executed in the appropriate order by examining metadata records generated by filter driver 221 in response to application activity undertaken during the process. A transactional event may be generated if the specified sequence of content access events has occurred. In another case, a content processor 330 may be configured to determine whether file system content is well-formed, according to a particular syntax or schema. For example, a content processor 330 may examine metadata records or file data following an update to determine whether it is syntactically correct, properly structured (i.e., required data is present), etc.

In another embodiment, a content processor 330 may be configured to actively modify file system content, and/or to invoke other applications in response to detecting various transactional events, in addition to publishing such transactional events to publish-subscribe system 600. For example, in a document publishing environment, a given document may be made available to users in several different formats (e.g., Portable Document Format (PDF), HTML format, Microsoft Word format). In such an environment, a content processor 330 may be configured to automate the generation of necessary versions of a given document, and to publish one or more transactional events indicated such generation. For example, a content processor 330 may be configured to detect when a master version of a document in a given file 250 has been updated, by detecting a metadata record of an update to that file in named stream 260 and/or event log 270. Upon detecting the update, content processor 330 may invoke the appropriate generator or translator applications to convert the updated master version to each of the desired formats. Such conversion may occur transparently to the user or application updating the master document, or that application (or any other application subscribing to the transactional event) may detect the update when the corresponding transactional event is published to channels 500.

In some embodiments, content processors 330 may be configured to generate different forms of output in addition to publication of transactional events. In one embodiment, a content processor 330 may generate an out-of-band metadata record in response to its processing. For example, a content processor 330 configured to perform schema validation of structured data in a given file 250 may generate a metadata record indicating the status of its check within the corresponding named stream 260. In other embodiments, content processors 330 may be configured to generate or modify file data instead of or in addition to metadata. For example, the aforementioned schema validator may be configured to correct certain defects detected while validating structured data, such as by truncating malformed records or filling in missing data fields. As another example, content processors 330 may be configured to interact with applications or users. For example, a content processor 330 may be configured to invoke an application's API in response to detecting a particular event such as a document content update. It is contemplated that in one embodiment, one or more content processors 330 may be configured to generate metadata records in an extensible, self-describing data format such as described above, which may include a format compliant with any version of the XML format.

It is noted that while content processing system 300 and its various components may interact with applications that are processes 112 within application layer 100 as described above, content processing system 300 and its various components are distinct from applications. In general, particular applications may not be aware of the activity of other applications and may not have access to the metadata generated during the course of operation of file system 205. However, in the illustrated embodiment content processing system 300 does have access to such metadata, and by virtue of such access may be configured to detect transactional events not fully represented by the operation of a particular application.

It is further noted that publication of transactional events to publish-subscribe system 600 may be performed similarly to the publication of file system content access events as illustrated in FIG. 7 and described above. Additionally, it is contemplated that any of the elements illustrated in FIG. 2-8, including file system 205, content processing system 300, channels 500, subscribers/applications 510, publish-subscribe system 600, and query system 610 may be implemented as program instructions and data stored and/or conveyed by a computer-accessible medium as described above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a storage device configured to store data;
   a query system configured to evaluate queries formulated in a query language; and
   a file system configured to manage access to said storage device and to store file system content to said storage device, wherein said file system is further configured to:
   detect a file system content access event; and
   in response to detecting said file system content access event, publish a record of said file system content access event to one or more of a plurality of publish-subscribe channels, wherein each of said plurality of publish-subscribe channels is associated with a respective query;
   wherein a particular one of said plurality of publish-subscribe channels is configured to deliver said record of said file system content access event to one or more applications that are distinct from said file system dependent upon determining that said one or more applications are subscribed to said publish-subscribe channel and further dependent upon said query system determining that said file system content access event satisfies said respective query associated with said particular publish-subscribe channel.

2. The system as recited in claim 1, further comprising a content processor configured to detect a transactional event, wherein said transactional event occurs in response to one or more file system content access events or in response to detecting one or more particular states of file system content, and wherein a transactional event record corresponding to said transactional event is published to said publish-subscribe channel in response to determining that said transactional event satisfies said given query.

3. The system as recited in claim 1, wherein said query system is further configured to evaluate said given query in response to receiving an indication of said file system content access event, and wherein said record is published to said publish-subscribe channel dependent upon said evaluation.

4. The system as recited in claim 1, wherein said query system is further configured to evaluate said given query in response to receiving a channel content request from a given one of said one or more applications, and wherein said publish-subscribe channel is further configured to convey said record to said given application dependent upon said evaluation.

5. The system as recited in claim 4, wherein said channel content request includes a timestamp, and wherein said publish-subscribe channel is further configured to convey said record to said given application dependent upon said record corresponding to an event occurring more recently than a time indicated by said timestamp.

6. The system as recited in claim 1, wherein said given query and state associated with said publish-subscribe channel are stored within said query system.

7. The system as recited in claim 1, wherein said given query and state associated with said publish-subscribe channel are stored externally to said query system.

8. The system as recited in claim 1, wherein said query language is compliant with a version of Extensible Markup Language (XML) Query Language (XQuery).

9. The system as recited in claim 1, wherein said record is stored in a data format compliant with a version of Extensible Markup Language (XML) format.

10. The system as recited in claim 1, wherein said publish-subscribe channel is compliant with a version of Resource Description Framework (RDF) Site Summary syndication protocol (RSS protocol).

11. A method, comprising:
    a file system storing file system content to a storage device and detecting a file system content access event directed to said file system content;
    in response to detecting said file system , said file system publishing a record of said file system content access event to one or more of a plurality of publish-subscribe channels, wherein each of said plurality of publish-subscribe channels is associated with a respective query formulated in a query language; and
    a particular one of said publish-subscribe channels delivering said record of said file system content access event to one or more applications that are distinct from said file system dependent upon determining that said one or more applications are subscribed to said publish-subscribe channel and further dependent upon a query system determining that said file system content access event satisfies said respective query associated with said particular publish-subscribe channel.

12. The method as recited in claim 11, further comprising:
    detecting a transactional event; and
    publishing a transactional event record corresponding to said transactional event to said publish-subscribe channel in response to determining that said transactional event satisfies said query;
    wherein said transactional event occurs in response to one or more file system content access events or in response to detecting one or more particular states of file system content.

13. The method as recited in claim 11, wherein said query language is compliant with a version of Extensible Markup Language (XML) Query Language (XQuery).

14. The method as recited in claim 11, wherein said record is stored in a data format compliant with a version of Extensible Markup Language (XML) format.

15. The method as recited in claim 11, wherein said publish-subscribe channel is compliant with a version of Resource Description Framework (RDF) Site Summary syndication protocol (RSS protocol).

16. A computer-accessible storage medium comprising program instructions, wherein the program instructions are executable to implement:
    a file system storing file system content to a storage device and detecting a file system content access event directed to said file system content;
    a query system evaluating queries formulated in a query language;
    in response to detecting said file system content access event, said file system publishing a record of said file system content access event to one or more of a plurality of publish-subscribe channels, wherein each of said plurality of publish-subscribe channels is associated with a respective query; and
    a particular one of said publish-subscribe channels delivering said record of said file system content access event to one or more applications that are distinct from said file system dependent upon determining that said one or more applications are subscribed to said publish-subscribe channel and further dependent upon said query system determining that said file system content access event satisfies said respective query associated with said particular publish-subscribe channel.

17. The computer-accessible storage medium as recited in claim 16, wherein the program instructions are further executable to:

detect a transactional event; and publish a transactional event record corresponding to said transactional event to said publish-subscribe channel in response to determining that said transactional event satisfies said query;

wherein said transactional event occurs in response to one or more file system content access events or in response to detecting one or more particular states of file system content.

18. The computer-accessible storage medium as recited in claim 16, wherein said query language is compliant with a version of Extensible Markup Language (XML) Query Language (XQuery).

19. The computer-accessible storage medium as recited in claim 16, wherein said record is stored in a data format compliant with a version of Extensible Markup Language (XML) format.

20. The computer-accessible storage medium as recited in claim 16, wherein said publish-subscribe channel is compliant with a version of Resource Description Framework (RDF) Site Summary syndication protocol (RSS protocol).

* * * * *

UNITED STATES PATENT AND TRADEMARK OFFICE
CERTIFICATE OF CORRECTION

| | | |
|---|---|---|
| PATENT NO. | : 7,437,375 B2 | Page 1 of 1 |
| APPLICATION NO. | : 10/919855 | |
| DATED | : October 14, 2008 | |
| INVENTOR(S) | : Dhrubajyoti Borthakur and Nur Premo | |

It is certified that error appears in the above-identified patent and that said Letters Patent is hereby corrected as shown below:

In the Claims:

Claim 11, col. 26, line 9, please change "in response to detecting said file system, said file system" to "in response to detecting said file system content access event, said file system".

Signed and Sealed this

Seventh Day of April, 2009

JOHN DOLL
*Acting Director of the United States Patent and Trademark Office*